(12) United States Patent
Green et al.

(10) Patent No.: US 6,595,442 B1
(45) Date of Patent: Jul. 22, 2003

(54) METHOD AND APPARATUS FOR MULCHING WASTE

(75) Inventors: Robert James Green, Rosebud (AU); Maxwell Roper, W. Rosebud (AU)

(73) Assignee: Enviro-Mulch Pty Ltd. (AU)

( * ) Notice: Subject to any disclaimer, the term of this patent is extended or adjusted under 35 U.S.C. 154(b) by 0 days.

(21) Appl. No.: 09/700,073

(22) PCT Filed: May 12, 1999

(86) PCT No.: PCT/AU99/00351

§ 371 (c)(1),
(2), (4) Date: May 11, 2001

(87) PCT Pub. No.: WO99/58259

PCT Pub. Date: Nov. 18, 1999

(30) Foreign Application Priority Data

May 12, 1998 (AU) .............................................. PP 3442

(51) Int. Cl.⁷ .............................................. B02C 19/12
(52) U.S. Cl. .............................. 241/29; 71/23; 241/160
(58) Field of Search .............................. 241/29, 21, 242, 241/160, 60; 71/23

(56) References Cited

U.S. PATENT DOCUMENTS 5,709,729 A    1/1998   Mitchell

FOREIGN PATENT DOCUMENTS

| DE | 29619281 U1 | 1/1997 |
|----|-------------|--------|
| EP | 418707 A | 3/1991 |
| EP | 505907 A1 | 9/1992 |
| JP | 54-070966 A2 | 6/1979 |
| JP | 54-075364 A2 | 6/1979 |
| JP | 02167878 A | 6/1990 |
| JP | 09299823 A | 11/1997 |
| RU | 2021891 C1 | 10/1994 |
| SU | 1761474 A1 | 9/1992 |
| SU | 1787776 A1 | 1/1993 |
| SU | 1808704 A1 | 4/1993 |
| WO | WO 95/11206 | 4/1995 |

Primary Examiner—Mark Rosenbaum
(74) Attorney, Agent, or Firm—Wolf, Greenfield & Sacks, P.C.

(57) ABSTRACT

Method and apparatus for processing green organic waste (hereafter "GOM") into mulch particles for forming a mulch windrow including feeding means (11) for feeding GOM to a first cutting zone and rotating a plurality of blades (25) through that zone to cut the GOM into smaller particles, transferring the particles to a second cutting zone and rotating a plurality of blades (25) therethrough, to reduce their size to a suitable mulch particle size and ejecting the mulch particles at high velocity to form a windrow. The method and apparatus further includes the addition of moisture to increase the moisture content of the windrow formed.

18 Claims, 5 Drawing Sheets

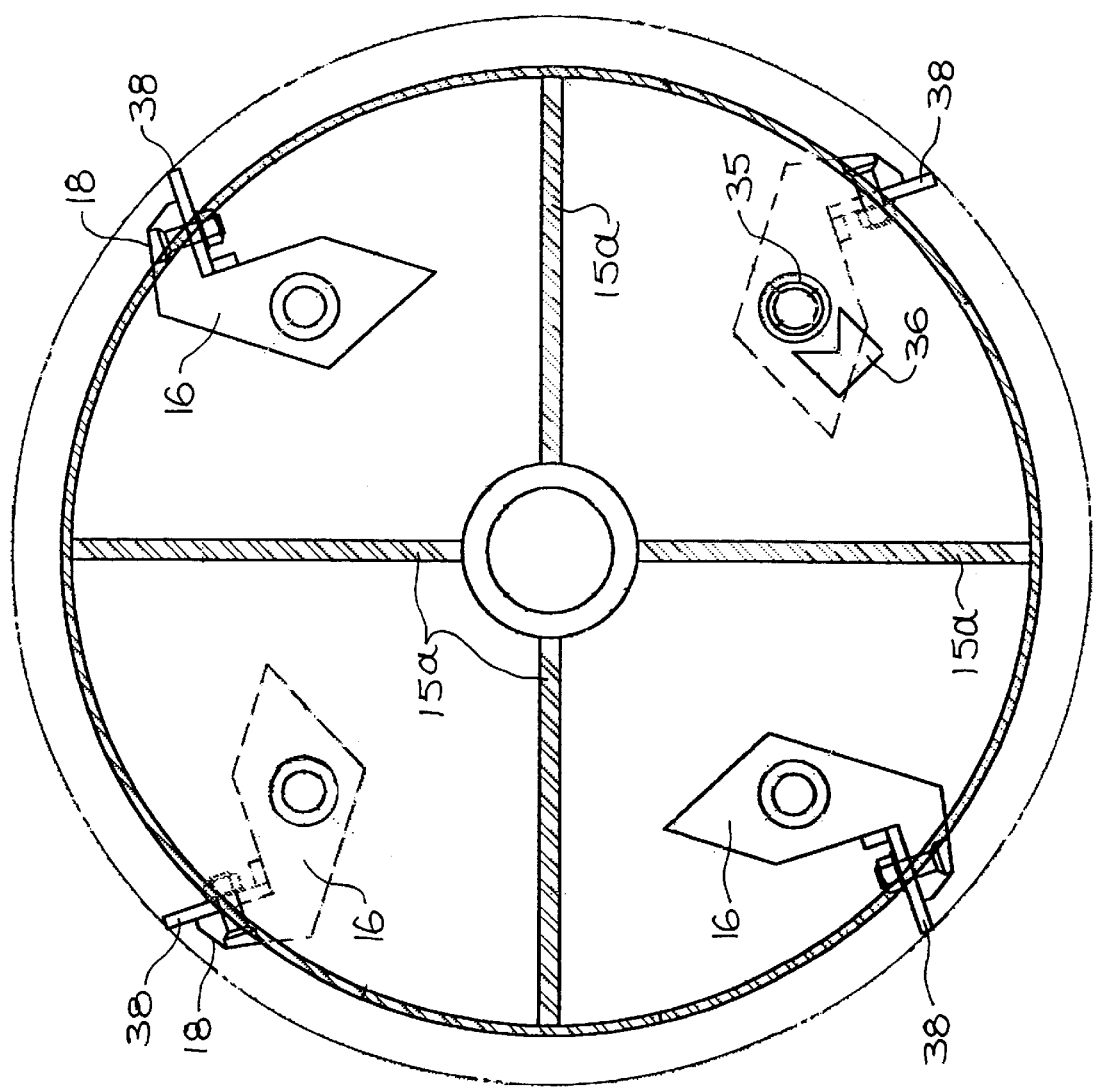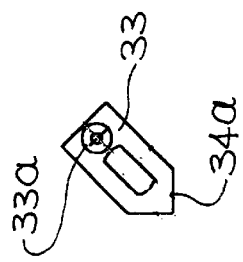
FIG 4

METHOD AND APPARATUS FOR MULCHING WASTE

The present invention relates to a method and apparatus for mulching waste material and is particularly although not exclusively concerned with mulching of green organic material (GOM) for the purpose of converting that GOM into a form for composting. It will be convenient therefore to describe the invention as it relates to that application, although it should be appreciated that the invention has wider application in the mulching of various waste products.

Green organic material is an expression adopted to cover a wide range of organic waste and includes wooden waste products such as trees, branches, logs, grass cuttings, hard and croft woods and other foliage, but excludes treated wooden products. The disposal of GOM traditionally has been by way of dumping, such as into rubbish dumps or land fills, or if possible it has also been burnt off. However, in more recent years, GOM more and more is being treated to produce organic compost and the demand for such compost over recent years has steadily grown.

Australian Standard 4454/1997 governs the characteristics preferred for commercial sale of compost and that Standard covers a variety of composting systems and products. The present invention is highly suitable for producing compost through the open windrow composting system and can meet the requirements of the Standard for that system although it does have application to other composting systems.

Open windrow composting for GOM is known and normally involves treating the GOM in a manner which reduces the GOM into smaller particles and feeding the treated product to a stockpile. The product is then screened to eliminate particles which are too large for open windrow composting after which fertiliser is added and the product then windrowed. The larger particles which do not pass through the screen the first time are retreated to reduce their size and are then fertilised and windrowed as before. Most machinery manufactured for mulching GOM in the above manner has employed a hammer mechanism which applies a repetitive impact force to the GOM so as to break it down into smaller particles. The particles are collected, before being passed over sorting screens through which particles of the desired size fall. The process is continuous, so that particles which do not fall through the screens are returned for further impact treatment before again being passed over the sorting screens. The process continues until all the GOM has been converted to a size that fits through the screens. When the particles pass through the screens they fall onto a conveyor which transports the GOM to be windrowed.

A disadvantage with known mulching machines concerns the of use particle screens. Such screens are commonly clogged over time by particles that are small enough to be trapped by the screen, but which are too large to pass through. Periodic cleaning or changing of the screens is therefore required and that creates downtime for the machine. The screens also tend to limit access to the internal components of the machine, so that maintenance of the machine is made more difficult. A further disadvantage relates to the product produced by such machines, because it is not in a form which can be windrowed without further treatment. Normally, the particles are required to the treated with fertiliser prior to windrowing, to produce mulch that will adequately compost according to the requirements for commercial compost as set out in Australian Standard 4454/1997.

It is an object of the invention to overcome or at least alleviate one or more of the disadvantages of the prior art.

In particular, it is an object of the invention to produce a mulch which can be windrowed immediately and preferably without further treatment. It is a further object of the invention to produce a mulch which has a controlled moisture content and particle size.

According to the present invention there is provided a method of processing green organic waste (hereafter "GOM") into mulch product for forming a mulch windrow, including feeding GOM to a first cutting zone and rotating a plurality of blades through that zone to cut the GOM into smaller particles, transferring the particles to a second cutting zone and rotating a plurality of blades therethrough to reduce their size to a suitable mulch particle size and ejecting said mulch particles at high velocity to form a windrow, the method further including the addition of moisture to increase the moisture content at the windrow formed.

The present invention also provides apparatus for processing GOM to form mulch particles for a mulch windrow, said apparatus including a first cutting zone and at least one blade for rotation through said first cutting zone for cutting the GOM into particles, a second cutting zone and at least one blade for rotation through said second cutting zone for cutting said particles to reduce their size to a suitable mulch particle size, feeding means to feed GOM to said first cutting zone and ejecting means to eject said mulch particles from said second cutting zone at high velocity to form a windrow, and means to increase the moisture content of the windrow formed by adding moisture.

The invention as defined above is distinguished from the prior art, because the mulch particles produced are of a size and moisture content that readily composts when formed into a windrow. Additionally, the use of the rotating blades as opposed to impacting hammers facilitates reduction of the GOM without requiring sorting screens. The size of the particles formed by the invention is partly a function of the speed at which GOM is fed to the first cutting zone, and partly a function of the rotational velocity of the blades rotating through the respective cutting zones. GOM can be processed at quite high speed. For example the following feed speeds to the first cutting zone are appropriate Larger material (150 mm–300 mm dia branches and twigs)–0.125 m/s Medium material (150 mm–150 mm dia branches and twigs)–0.25 m/s Small material (0.50 mm dia branches and twigs)–0.5 m/s For the above feeding speeds, it is preferred that the blades rotate at a high speed in the range of 1600 RPM. Within these ranges, the particle size of the GOM produced can be in the region of 0.50 mm which is an optimum size for composting.

The addition of moisture to the particles ensures that the mulch product can be produced with an optimum moisture content, preferably around 38%, conducive to composting. The moisture typically can be provided in the form of water and preferably is injected through water jets into the particles in an evenly distributed manner. The water is preferably injected into the first cutting zone, although it may be injected elsewhere. Preferably the volume of water injected can be controlled and varied as necessary, so that variations in the moisture content of the GOM prior to mulching can be accommodated. Also, the water can contain such additives as considered desirable for proper or optimum composting of the mulch formed, such as nutrients.

It is a characteristic of the known machinery and methods that they do not, and largely cannot, add water. The reason for this, is that the mulch product is delivered to form a windrow via a conveyor and that delivery does not facilitate addition of moisture. Additionally, the delivery of the particle mulch in this manner also does not result in a windrow which is of a density achievable by the method and apparatus of the invention, as will become apparent later. The deficiency in moisture content and density can seriously inhibit the microbial activity within the windrow which is essential for composting. If the windrow is left in this state for some time, it can possibly turn aerobic or anaerobic depending upon the density thereof and that could cause pH imbalance if the windrow has proceeded to that state. The method and apparatus of the invention can be used to correct this problem by re-mulching the windrow and adding correct nutrients just prior to re-mulching or by injecting water during re-mulching.

The blades which pass through the first and second cutting zones can be supported on separate blade mounting arrangements which rotate about separate axes. Preferably however, the blades are supported on a single blade mounting arrangement which is arranged so that the blades pass through both cutting zones, the zones being displaced from each other about the rotational path of the blade mounting arrangement.

The blade mounting arrangement can include any number of blades suitably arranged relative to one another and it is possible that a single blade be provided. However, it is preferred that a plurality of blades be provided and in one mounting arrangement, a cylindrical cutting mill is provided, which supports a plurality of blades extending both axially thereof and extending outwardly beyond the circumference of the mill. Separate groups of axially extending blades can be disposed of circumferentially of the mill and in a preferred arrangement, four groups of axially extending blades are spaced equidistantly about the mill circumference.

The blade or blades are preferably mounted for movement relative to the cutting mill and in one arrangement, they are rotatably mounted to the cutting mill. This ability to rotate reduces the potential for damage to occur to the blades in the event that the GOM encountered is too hard for the blade to cut, or if other GOM, such as metallic nails or rocks etc enter the cutting zones. Alternative arrangements, such as spring mounting arrangements, are also appropriate for this purpose.

The transfer of particles from the first cutting zone to the second cutting zone can occur in any suitable manner by any suitable means. In one preferred form, the blades which pass through the first cutting zone imparts a force in a direction which causes the particles to move into the second cutting zone. Thus, the angle at which the blades engage the GOM at the first cutting zone may be such as to cause the particles to be pushed toward the second cutting zone. Alternatively, or in addition to, guiding means may be employed. The guiding means may take the form of a guiding plate or plates, which direct the particles to the second cutting zone.

The ejection of particles from the apparatus can be facilitated by any suitable means. Preferably however, the blade speed through the second cutting zone is such as to impart a velocity to the particles that is sufficient for their ejection and for the creation of a windrow of desired characteristics. The velocity of the particles principally determines the density of the windrow and that velocity can be controlled by altering the rotational speed of the blades through the second cutting zone. The density of a windrow formed by the invention can be greater than that formed by conventional means and occurs principally due to the impact of mulch particles to progressively laid layers of mulch. This arrangement is distinguished from the prior art in which the mulch, once prepared and treated, is laid in a windrow, not ejected according to the invention.

Guiding means are preferably provided to guide the mulch particles in the correct manner to form a windrow. The guiding means can include a plate which directs the mulch particles in the desired direction from the second cutting zone and that plate may be flat, or curved to form a channel and may be adjustable in the direction it guides the particles. In one form, the guiding means includes a delivery chute from which the particles are delivered to form a windrow. The delivery chute can be formed to spread or to compact the mulch particles received from the second cutting zone and the chute may be adjustable to adjust the direction at which the mulch particles exit the chute.

The apparatus of the invention is preferably portable and is preferably mounted on a trailer or formed with wheels. The apparatus preferably can be trailed behind a car, truck or tractor, or includes its own motive capability, so that a windrow of some length can be progressively formed by progressive movement of the apparatus.

The method and apparatus of the invention is such as to produce mulch of a controllable moisture content which can be used to form a windrow for composting. Additionally the use of rotary blades at two separate zones results in an optimum particle sizes for composting without the need for particle screens. The preferred aspects of the invention facilitate the formation of a densely packed windrow which can be formed in a relatively easy manner. The invention therefore has significant advantages in the composting industry.

The attached drawings show an example embodiment of the invention included in an assembly of the foregoing kind. The particularity of those drawings and the associated description does not supersede the generality of the preceding broad description of the invention.

FIG. 4 is a side view of the rotary cutting mill of FIG. 1.

Figure 1:
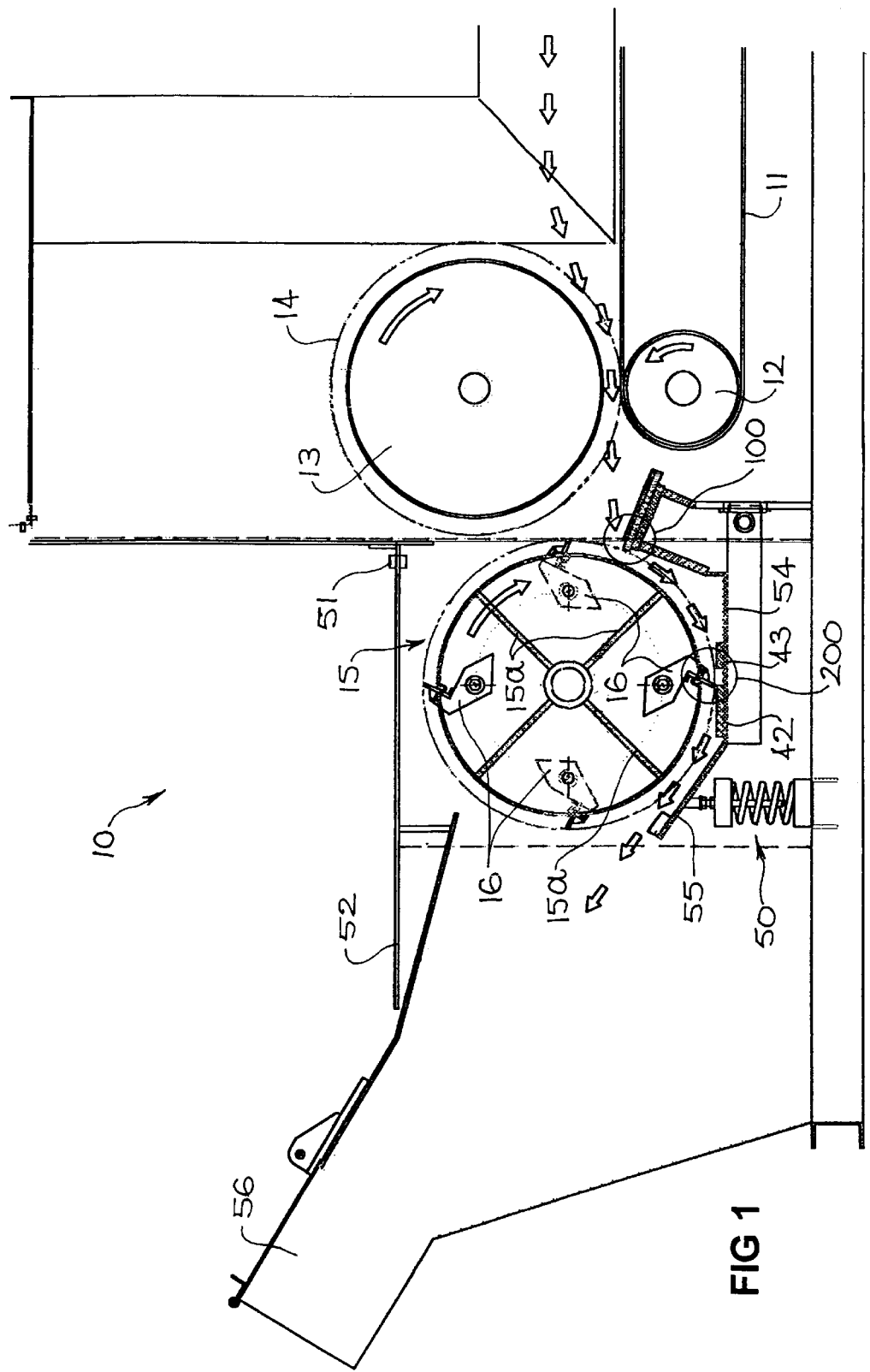
FIG. 1 is a side cross-sectional view of an apparatus according to one aspect of the invention.

FIG. 1 shows a schematic cross-sectional view of a mulching machine according to one aspect of the invention. The machine 10 includes a feeding facility having an infeed conveyor belt 11 rotatable about a conveyer roller 12 which rotates in an anti-clockwise direction as shown. The conveyer roller 12 may be driven by any suitable drive means and those drive means may be applied at any suitable location to drive the roller 12, or another roller located at the opposite end of the infeed conveyor belt 11 which is not shown in FIG. 1. The infeed conveyor belt 11 supports and conveys GOM which is to be treated by the mulching machine 10.

The axis of the conveyer roller 12 about which the infeed conveyor belt 11 travels is located substantially directly below the axis of the infeed roller 13, which is also driven by suitable drive means, but in a clockwise direction as shown. The drive means can be arranged to drive both the infeed roller 13 and the infeed conveyer belt 11 and such a drive means can be for example, hydraulically operated. Preferably, the drive means provides variable speed drive and is reversible to clear GOM from between the infeed roller 13 and the infeed conveyer belt 11 if a jam occurs.

The location of the infeed roller 13 above the conveyer roller 12 enables the GOM material passing the therebetween to be compressed prior to mulching. This compression serves to securely hold the GOM and to force it through the feeding facility in the direction indicated.

In FIG. 1, the infeed roller 13 is shown to have a continuous circular outline spaced above the conveyor belt 11, while a circular dot outline spaced radially outwardly of the continuous outline is shown in engagement with the belt 11. The dot outline is indicative of a plurality of axially spaced rings 14 extending radially outwardly of the infeed roller 13 and the edges of these rings are formed with axially facing teeth. That arrangement enables the infeed roller 13 to grip the GOM between adjacent rings 14 and to cause it to be pushed or dragged between it and the conveyor belt 11 in the direction indicated.

One, or in some circumstances, both of the conveyor roller 12 or the infeed roller 13 may be resiliently mounted, such as spring mounted, so that any large and incompressible matter that finds its way between the respective rollers can pass through without damaging the roller. The spring mounting may be made with traditional coil or cantilever springs or alternatively, a resilient rubber mounting may be provided. Alternatively, the infeed roller 13 may be mounted for substantially vertical movement when such matter is encountered, with return movement being under the effect of gravity. Other arrangements are also possible.

The infeed roller 13 is required to be of robust construction and preferably is also of a material which is non-corrosive because it will be exposed to moisture. Equally, the infeed conveyer belt 11 is also required to be robust, as it will be exposed to high levels of abrasive force, particularly between the conveyer and infeed rollers.

GOM which passes through the infeed conveyer and rollers is engaged by cutting means in the form of a cutting mill 15. The cutting mill 15 is rotatably mounted and rotates in a clockwise direction as shown. The axis of rotation of the cutting mill is located between the corresponding axes of rotation of the conveyer roller 12 and the infeed roller 13, although that positioning is a matter of design choice only. However, in the arrangement of the machine 10 as illustrated, the position of the cutting mill 15 relative to the rollers 12 and 13 facilitates a very compact arrangement.

Figure 2:
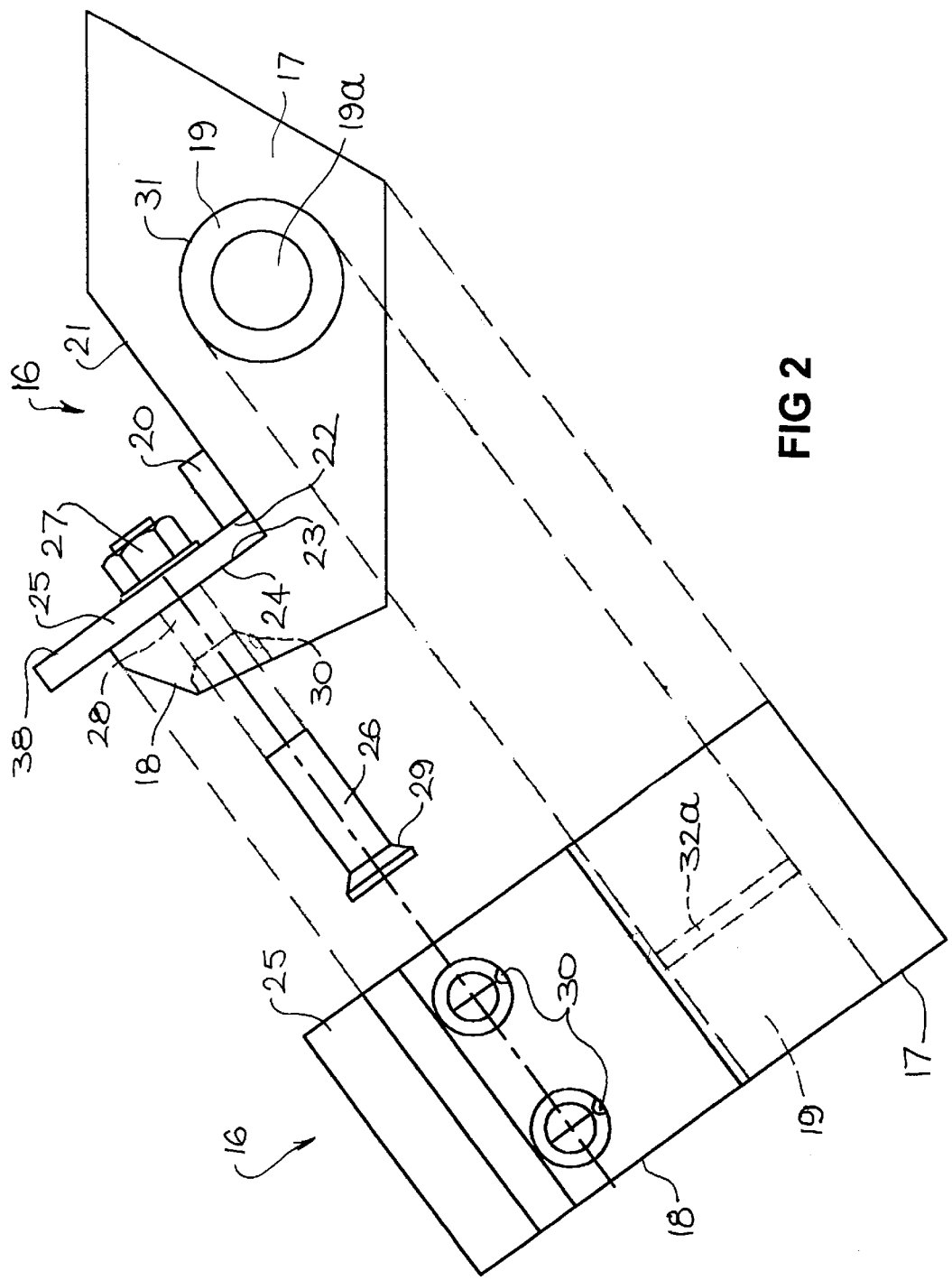
FIG. 2 shows two views of a blade supporting hammer of FIG. 1.

The cutting mill 15 supports a plurality of cutting members in the form of cutting blade supporting hammers 16 and in FIG. 1, four of these hammers are shown. It needs to be appreciated that the hammers 16 differ from the hammers associated with previous mulching machinery, in that the hammers of the prior art applied only a crushing impact force as apposed to a cutting or slicing force. The hammers of the prior art therefore have a different effect on the GOM compared to the hammers of the invention. FIG. 2 illustrates an individual hammer 16 in more detail and reference will now be made to that figure.

FIG. 2 shows two views of a hammer 16, namely a rear and a side view. From these figures, it can be seen that each hammer 16 includes a body 17 and a depending arm 18. The body 17 is formed with an opening 31 to accept a bush 19 and the bush 19 is provided to accept a mounting shaft 19a with which it is mounted to the cutting mill 15. The hammer 16 further includes retaining means to retain a mulching blade thereagainst and the retaining means in part includes an abutment member 20 which is fixed by any suitable means to a peripheral surface 21 of the body 17. For example, the abutment member 20 may be fixed to the surface 21 by welding, or by a bolt fastener. A rear surface 22 of the abutment member 20 is spaced from a leading surface 23 of the depending arm 18, a distance sufficient to snugly receive therebetween a bottom end 24 of a mulching blade 25. In order to accommodate blades of different thicknesses, the abutment member may alternatively be adjustably mounted to the peripheral surface 21.

The blade 25 is further secured to the hammer 16, by releasable means in the form of a nut and bolt fastener 26 and 27. The threaded bolt 26 extends through an opening 28 in the depending arm 18 and is releasably engaged by the nut 27. The opening 28 is countersunk to accommodate the bolt head 29 and the bolt head includes a notch to accommodate a welded button 30 which is formed within the countersunk portion of the opening 28 to prevent rotation of the bolt 26.

The above arrangement securely locates a mulching blade 25 relative to the hammer 16, in a manner which facilitates quick and easy release of the blade when necessary due to wear or damage. Clearly however, other arrangements could be employed to secure a blade to the hammer and these arrangements are within the scope of the invention.

Each hammer 16 is secured to the cutting mill 15 in the following manner. Bushes 19, are inserted into the opening 31 formed in the body 17 of the hammer 16 and each hammer 16 is placed between a pair of supporting plates 32 (see FIG. 3). This arrangement of the bushes 19 can be seen in FIG. 2, which also shows that the bushes 19 are separated by a gap 32a.

The opening 31 of the hammer 16, is aligned with corresponding openings formed in the supporting plates 32 and the shaft 19a is inserted through the pair of bushes 19, and between the pair of supporting plates 32 through their openings, to locate the hammer 16 thereto. As will be discussed later, the hammers 16 may be so mounted as to be rotatable about the shaft 19a, or so as to be fixed to the shaft 19a which itself is rotatable within the opening 31.

The figures showing side views of the cutting mill 15 show that a hammer 16, or more correctly a row of hammers 16, are positioned in each quadrant of the cylindrical mill 15. A single shaft 19a provided for each quadrant can be used to locate each hammer or row of hammers in the cutting mill 15, by that shaft extending between opposed sides of the mill. The shafts 19a are not shown in FIG. 3 but these would extend between opposite end supporting plates 32a and 32b, and would locate each of the hammers 16 therebetween and as discussed above, the hammers 16 can each rotate between the supporting plates 32. The shafts 19a can be fixed in place against a pair of end supporting plates 32b and one arrangement suitable for that purpose is shown in FIG. 4. The fixing arrangement includes a fixing member 33 which has an opening 33a through which the shaft 19a is received. A circlip arrangement, or any other suitable arrangement can be employed to fix the shaft 19a relative to the fixing member 33. The fixing member 33 is located on the outer side of the end supporting plates 32b and includes a pointed end 34a that is configured to be received within a cavity 35 of a plate 36 which is fixed to the outer surface of the end supporting plates 32b by any suitable means such as welding. Receipt of the shaft 19a within the opening 33a of the fixing member 33 can be such that the shaft is fixed against rotating relative to the cutting mill 15. In that arrangement the or each hammer 16 can, as discussed earlier, be arranged to rotate relative to the shaft 19a and this rotation of the hammers can prevent or minimise damage that might otherwise occur to the blades when performing a cutting action if the product to the cut is too hard, such as a nail or rock. In that case, the hammer 16 can rotate in the opposite direction to the rotation of the cutting mill 15 and allow passage of the object through the machine 10 without, or with minimum damage to the blade.

Figure 3:
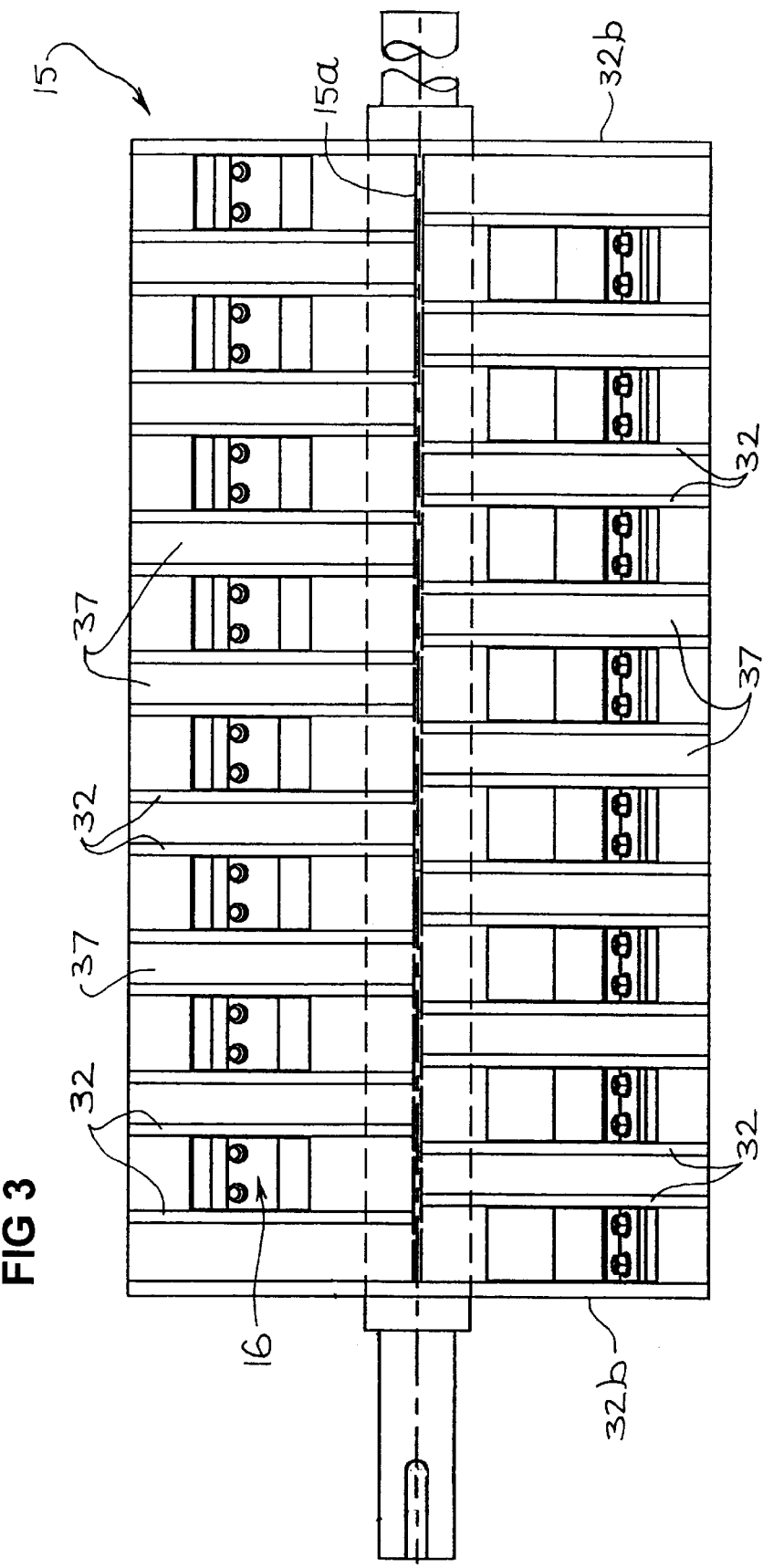
FIG. 3 is a plan view of the rotary cutting mill of FIG. 1.

As seen in FIG. 3, a plurality of hammers 16 are spaced axially across the cutting mill 15. Each hammer 16 is fixed, as described earlier, between a pair of supporting plates 32 and each pair of supporting plates is also spaced apart. The supporting plates 32 are formed in each quadrant of the cutting mill 15 as a segment of a circle and are fitted to the cross-members 15a of the cutting mill 15. (see FIGS. 1 and 4). The separate rows of cutting hammers (of which in FIG. 3 only two rows of the four which can be seen in the side views of FIGS. 1 and 4 are shown), are axially displaced so that the gaps 37 between pairs of supporting members 32 of one row, are aligned with the hammer 16 of an adjacent row. In practice, each of the gaps 37 may be covered or closed at their open end, ie at the circumference of the cutting mill 15, by curved cover plates of the same radius as the end supporting plates 32b so that material to be mulched is prevented from entering these gaps.

As seen in each of the FIGS. 1, 2 and 4, in side view, the hammer 16 has a particular shape, but that shape is not of significant importance to the present invention. Indeed, the hammer 16 could take a variety of shapes, which function in the required manner. The particular shape shown causes the blade to be exposed beyond the outer circumference of the cutting mill 15 when the mill is rotating during operation of the machine, because of the weight distribution of the material forming the hammer. However, the hammers remain rotatable about the shaft 19a so that hard objects can be passed through the machine 10 without damage to the blades 25 as discussed earlier.

Figure 5:
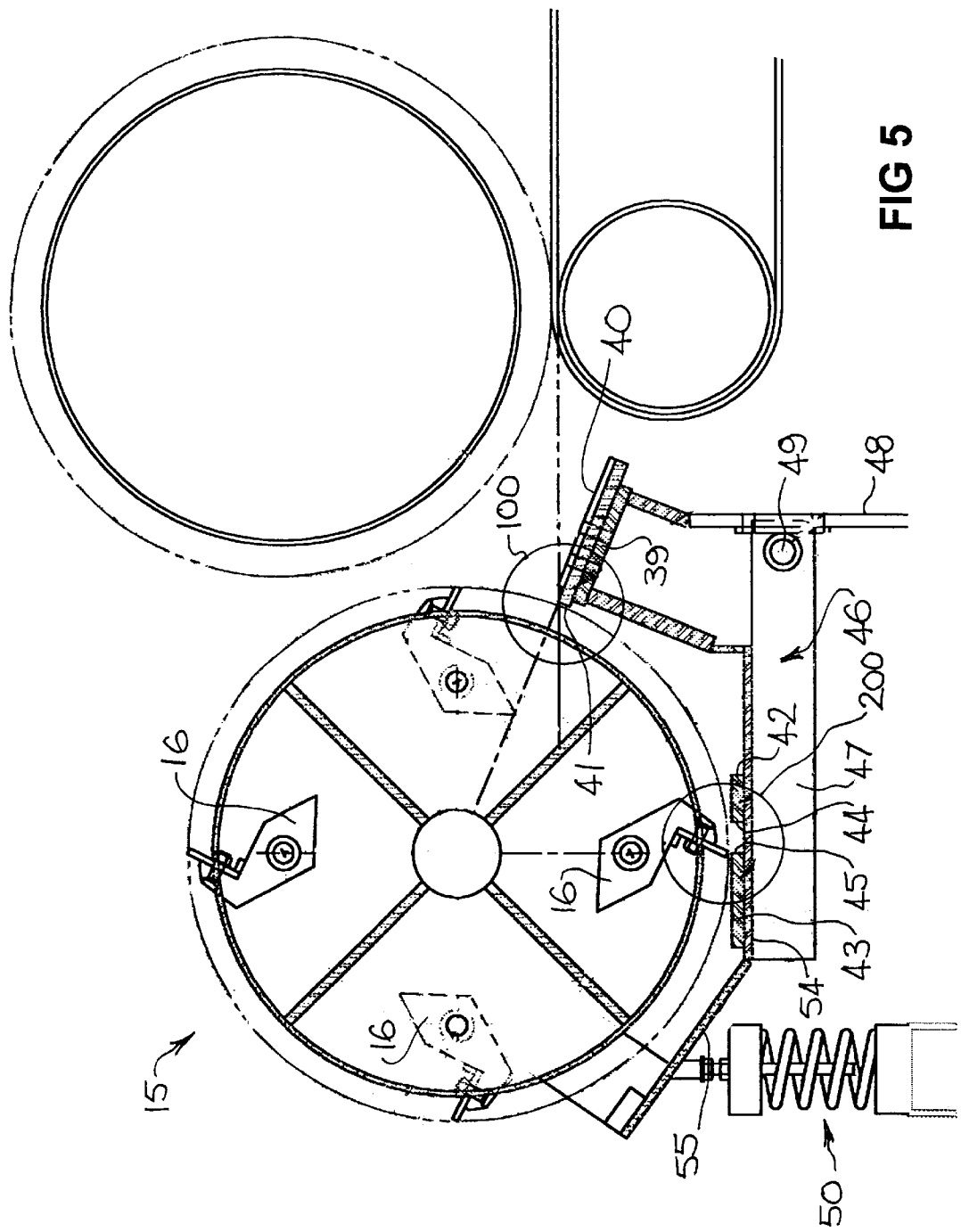
FIG. 5 is a further side view of the rotary cutting mill of FIG. 1, additionally showing associated components.

The exposure of the blades 25 beyond outer circumference of the cutting mill 15 is shown in FIG. 1, but is more clearly shown in FIG. 4. In these figures the hammers 16 are disposed in the cutting mill 15 in a manner that exposes the top end 38 of each blade 25 beyond the outer circumference of the mill 15. An outer portion of the depending arm 18 of the hammer 16 is also exposed but this need not necessarily be the case and will be at least partly dictated by the level of support required for the blade 25. The top end 38 of each blade is arranged to follow a circular path which brings it into close proximity to zones at which point mulching of the GOM can be facilitated. In the form of the mulching machine 10 illustrated, first and second cutting zones are provided and these include an arrangement employing one or more mulching blocks or anvils. In FIG. 1, a first anvil 39 is shown in a first cutting zone 100 with its primary cutting edge disposed at an angle of approximately 34° to horizontal. This arrangement is more clearly shown in FIG. 5 in which it is seen that the anvil 39 also includes an anvil cover plate 40. In this figure, the dot outline path of the tips of the blades 25 shows that the tips approach the leading edge 41 of the anvil 39 very closely. In practice, the distance between the tips and the leading edge 41 is in the order of 5 mm, although that distance can be altered to suit the type of GOM being mulched and the type of mulch required. Also, the angle at which the anvil 39 is disposed can be altered for similar considerations.

In the arrangement illustrated, second and third anvils 42 and 43 are also provided. Like the first anvil 39, the second and third anvils are positioned in close proximity to the path of travel of the blade tips 38. However, the second anvil 42 is positioned so that the closest point of travel of the blade tip 38 thereto is toward a rear edge 44 thereof, while the closest point of travel of the blade tips to the third anvil 43 is at a front edge 49.

The three anvils 39, 42 and 43, and the blades 25 of the hammers 16, effectively chop and mulch GOM which is fed into the mulching machine 10.

The machine 10 advantageously offers simple regulation of the treatment of the GOM, by facilitating control of the speed of the infeed conveyer belt 11 and conveyer roller 12, and the speed of the cutting mill 15. Such control can be used to regulate the size of mulch product produced by the machine 10.

Each of the anvils 39, 42 and 43 is mounted on a mounting arrangement 46 and that arrangement includes a beam 47 which is hinged to the frame 48 of the machine 10. The hinged connection 49 facilitates vertical movement of the mounting arrangement 46, so that any particles that may be of sufficient hardness to damage the blades or the anvils if they were to be jammed therebetween, will be accommodated by vertical movement of the mounting arrangement so that jamming is prevented. A spring arrangement 50 is employed to maintain the mounting arrangement 46 at the desired position, but permits resilient vertical movement of the mounting arrangement against the spring bias when required.

The mulching occurs principally due to the action of the blades on the GOM in each of the cutting zones 100 and 200. In the cutting zone 100, the GOM is subject to a first cutting action that cuts the GOM into particles. The average length of the particles is determined by the rotational speed of the cutting mill 15 and the speed at which the GOM is fed to the first cutting zone 100. It is envisaged that the cutting mill 15 will rotate at approximately 1600 RPM and the feeding speed of GOM will be approximately 0.125 m/s to produce particles of an average length of 40 mm although smaller and larger particles will be cut because not all GOM is fed in a straight line into the zone 100.

The mulch particles are then treated at the second cutting zone 200 and the arrangement of the cutting mill 15 and the anvil 39 is such as to promote transference of the particles from the first cutting zone 100 to the second cutting zone 200. That is, the angle at which the blades 25 engage the GOM at the anvil 39 promotes movement of the particles to the zone 200. Transference between zones could be effected by other means, but the described arrangement is preferred.

The cut particles are treated at the second cutting zone 200 to complete the mulch product. The anvil 42 serves as a stirrer of the particles, preventing them from building up in front of the anvil 43. The anvil 42 plays little or no other part in the mulching process. The blade tips pass into close proximity to the rear edge 44 of the anvil 43 and at that point, the blade applies a further cutting action to the mulch particles to further reduce their size, to an average length of 19 mm.

The engagement of the blades 25 with the particles at the second cutting zone 200 also causes the mulch product to be ejected from the cutting zone 200 at high velocity due to the rotational velocity of the cutting mill 15 and this is advantageous for ejecting the mulch product from the machine 10 and for forming a windrow as will be described later.

The machine 10 further employs the addition of water during the mulching process, so that the GOM being mulched can be kept moist. The addition of water to the GOM being treated ensures that the moisture content of the mulch product is sufficient for composting of that product to take place and the control of the added water can be such as to optimise the moisture content for maximum composting efficiency. Additionally, the addition of water to the mulch surpresses the generation of dust.

In the machine 10 illustrated, water is injected into the cutting mill 15, preferably to an area above the cutting edge of the first anvil 39. Injection of water is preferably controlled to limit the volume which is injected. Additionally, the injection of water is preferably limited to only those periods in which GOM is fed through the infeed and conveyor rollers. In a simple form, that control can be by way of a valve which is opened and closed upon movement of the infeed roller 13, when GOM is fed into the machine 10. For example vertical upward movement of the infeed roller 13 could cause the valve to open and water to be injected while vertical downward movement will cause the valve to close. This system limits water wastage as well as eliminating the potential for puddles to form below the machine, or for excess water to be collected in the windrow.

The water could be injected or otherwise supplied in alternative arrangements and these are within the scope of the invention. What is important is that water be available for supply to the mulch prior to its ejection from the machine to a windrow, so that the optimum moisture content can be obtained for maximum composting efficiency. The water can also contain additives, such as fertilisers, as appropriate.

For supplying water in the manner described, water jets 51 are provided and these direct water towards the leading edge 41 of the first anvil 39. The injection of water at this point ensures an even and thorough mixing of water with the mulch particles. The water jets 51 can take any suitable form as are known in the art. Two jets 51 may be provided at the position indicated in the roof 52 of the machine 10 which are spaced apart across the width of the cutting mill 15. Further jets may be provided as necessary such as at the sides of the cutting mill 15.

The water can have an additional function in the machine 10, and that is to act as a cooling medium. Thus, the water can be passed through a manifold in the hydraulic tank which supplies hydraulic fluid to drive various driven components of the machine, and this can take place prior to the water being injected into the mulch particles. The water can be circulated to other heated components as necessary to perform a similar cooling function.

The mounting arrangement 46 described earlier, further includes a plate 53 upon which each of the anvils 42 and 43 are mounted and which is connected at one end to the spring arrangement 50. The plate is formed to have two sections 54 and 55 which are arranged at an angle to one another. In use, the section 54 is substantially horizontal, while the section 55 is angled upwardly from the plate 54. The upwardly angled section 55 is so angled so as to direct mulch product into a delivery chute 56 seen in FIG. 1. The angle of incidence of the section 55 can be arranged as necessary to correctly direct the mulched product.

The delivery chute 56 performs an important function of the machine 10 as it directs the mulch for the formation of the windrow. The delivery chute can be hydraulically operated so that the direction of ejection of mulch can be controlled. For example, at the commencement of the windrow, the delivery chute can be directed substantially horizontally and as the height of the windrow increases the angle of the delivery chute can be altered.

The velocity of the mulch product which exits the cutting zone 200 can be sufficient to be directed along the inclined plate 55 and into the delivery chute 56 without additional assistance, although such assistance could be provided in an alternative arrangement. The velocity of the mulch product through the delivery chute 56 is in the region of 72 m/s when the cutting mill is rotating at 1600 RPM, although the velocity can vary depending on the angle at which the delivery chute 56 is disposed relative to the angle at which the mulch product enters the chute. The mulch product enters the delivery chute 56 and is directed from there to the windrow. This velocity advantageously tends to throw the larger mulch particles to the outside of the windrow. The delivery chute can have any suitable configuration and may include an extension which extends from the chute shown.

The geometry of the machine 10 illustrated, provides advantageous qualities which contribute to the proper operation thereof. In particular, the axes of rotation of each of the conveyor roller 12, the infeed roller 13 and the cutting mill 15 preferably are arranged according to a preset geometry to ensure optimum particle size and delivery of mulch. Thus, it is preferable that the axis of the cutting mill 15 be located in a plane below that of the infeed roller 13, but above that of the conveyor roller 12. That is the arrangement shown in FIG. 1 and that arrangement promotes passage of GOM toward the first cutting zone 100 of the machine 10 and the action of the cutting blades 15 and the anvil 39 is such as to drag the GOM from the feed facility and push the cut particles toward the second cutting zone 200.

The machine 10 as above described has several advantages over known machines. A primary advantage relates to the absence of screens for particle size screening. The absence of screens means that no downtime is created by the need to clean or replaced damaged screens. Downtime for that purpose occurs relatively frequently in known mulching machinery. The absence of screens additionally facilitates better maintenance of the machine by enabling easier access to machine components.

A further advantage of the machine 10, is that the moisture content of the mulch produced can be accurately controlled by the addition of water through the water jets 51. The provision of water supply means that water can be added during mulching so that separate addition after the mulch has been produced is not necessary. This is particularly advantageous, as the windrow which is formed is ready to commence composting immediately and does not require further treatment for that purpose.

A still further advantage of the machine is that the mulch particles can be formed in a size and in a suitably compacted manner in the windrow, in which further treatment of the mulch to facilitate composting thereof is unnecessary. In particular, the mulch product of the machine of the invention composts to produce a product which meets with the requirements of Australian Standard 4454/1997 with only two turns over a 14 day period. Such a composting rate has not been achieved anywhere in the world to the applicants knowledge in open windrow composting. This result has been achieved by a combination of controlled particle size and moisture content and also by the compacted form of windrow created. The compacted windrow is due to the angle of delivery of the mulch and the speed at which it is delivered, so that it is self compacting. The speed of delivery of the mulch is a function of the rotating speed of the cutting mill which rotates at speeds of approximately 1600 RPM. This compares with other machinery which runs at approximately 600 RPM. Thus, the mulch is ejected at a far greater velocity and thus impacts the windrow with a momentum sufficient to have a compacting effect.

The mix of mulch particles processed by the method and apparatus of the invention provides good aeration and the cutting action to which the GOM is subjected increases the surface area of the particles compared with windrows formed by conventional methods. That increased surface area allows easier access of the food substrates to the compost micro-organisms. There are three types of compost micro-organisms which feed on the food substrates, the first of which is called Psychrophilic which initiates the composting and in doing so generates heat up to 25° Celsius in the windrow. The second type of compost micro-organism is called Mesophilic and this takes over to further the composting, raising the temperature of the windrow to approximately 40° Celsius. A third compost micro-organism is called Themiophilic and this raises the temperature of the windrow to in excess of 70° Celsius.

Adding water via water jets to the mulch particles advantageously results in a moisture content of approximately 38% which is evenly distributed through out the windrow and which initiates and promotes activity of the compost micro-organisms. If water were not added, that activity could be delayed.

It is desired that the temperature of the windrow be at least 55° Celsius for a period of three days, so as to kill any weed seed or pathogens (disease) that may be present in the green organic material and this preferred requirement is incorporated into the Australian Standard 4454/97. As is apparent from the above description, a windrow produced according to the invention achieves such temperatures and these can be maintained for the minimum three day period.

The temperature of the windrow spreads from the centre thereof to approximately 1 meter from the outside. The windrow sections beyond this therefore do not generally reach the required composting temperatures and therefore, it is necessary that the windrow be turned over. That process involves taking the first meter or so from the outside of the windrow and placing that mulch to the middle of a new windrow. The other portions of the original windrow are placed on the outside of the new windrow. This turning of the windrow takes place a further two times at similar intervals and using the same procedure. After the third turn, the composted mulch is ready for use or sale. If the mulch is sitting for longer than two weeks, it is necessary for the windrow to be aerated by turning according to the above procedures, to prevent the mulch from becoming anaerobic. A typical composting period is in the region of 12 days.

The results obtained with the invention have been highly favourable. Tests to date have shown that a windrow of the following characteristics can be consistently produced.

Mulch Particle Size

| Classification | Actual Size (range mm) | Percentage % |
|---|---|---|
| Fine | 0–5 | 25 |
| Fine | 5–19 | 35 |
| Medium | 19–50 | 30 |
| Medium | 50–80 | 5 |
| Large | 80–over | 5 |

Windrow Size (In Meters)

| Height | Width at base | Length |
|---|---|---|
| 5 | 6 to 7 | 10 minimum |

Density—approximately 2.25 cubic meters per tonne.
Moisture content—approximately 38%
Oxygen content 8–12% in any part of the windrow
Time for production—approximately 3 hours
Composting period—12 days A windrow formed according to the invention can be approximately 20% denser than windrows formed by conventional means and with added moisture, composts readily, in accordance with the Australian Standard.

The invention described herein is susceptible to variations, modifications and/or additions other than those specifically described and it is to be understood that the invention includes all such variations, modifications and/or additions which fall within the spirit and scope of the above description.

What is claimed is:

1. A method of processing green organic material ("GOM") into mulch particles for forming a mulch windrow, including feeding GOM to a first cutting zone and rotating a plurality of blades through that zone to cut the GOM into smaller particles, transferring the particles to a second cutting zone and rotating a plurality of blades therethrough to further reduce their size to a suitable mulch particle size and ejecting said mulch particles from said second cutting zone by the action of said blades of said second cutting zone on said particles, at high velocity directly into a windrow formation, the method further including the addition of moisture to the GOM prior to ejection from said second cutting zone to increase the moisture content of the windrow formed.

2. A method according to claim 1, wherein moisture is added so that the moisture content of the windrow is about 38%.

3. A method according to claim 1, wherein water forms the moisture additive.

4. A method according to claim 3, wherein said water is added adjacent to the first cutting zone.

5. A method according to claim 1, wherein GOM is fed to said first cutting zone between 0.125 m/s and 0.5 m/s and said blades rotate in the range of 1600 RPM.

6. A method according to claim 1, wherein mulch particles are ejected at about 72 m/s.

7. Apparatus for processing green organic material ("GOM") to form mulch particles for a mulch windrow, said apparatus including a first cutting zone and at least one blade for rotation through said first cutting zone for cutting the GOM into smaller particles, a second cutting zone and at least one blade for rotation through said second cutting zone for cutting said particles to further reduce their size to a suitable mulch particle size, feeding means to feed GOM to said first cutting zone and ejecting means to eject said mulch particles from said second cutting zone at high velocity directly by the action of said blades of said second cutting zone in said particles, into a windrow formation, and means to increase the moisture content of the windrow formed by adding moisture to the GOM prior to ejection from said second cutting zone.

8. Apparatus according to claim 7, wherein said at least one blade that rotates through said first cutting zone also rotates through said second cutting zone.

9. Apparatus according to claim 7, wherein said at least one blade is rotatably mounted to said cylindrical mill for rotation relative thereto upon engagement with GOM or a particle or other material through which it is not able to cut.

10. Apparatus according to claim 7, including guide means for guiding the mulch particles during ejection from said second cutting zone, in a manner facilitating formation of a mulch windrow.

11. Apparatus according to claim 10, said guiding means including a plate for guiding the mulch particles and wherein said plate is adjustable to adjust the direction in which the mulch particles are directed.

12. Apparatus according to claim 7, said moisture increasing means including means to supply liquid at or between the feeding means and the ejecting means.

13. Apparatus according to claim 12, wherein the liquid is water and is supplied through one or more jets.

14. Apparatus according to claim 7, said feeding means including a conveyor to convey GOM placed thereon to said first cutting zone.

15. Apparatus according to claim 7, said feeding means including a conveyor belt mounted about one or more conveyor rollers, and an infeed roller rotatably mounted above and at one end of said conveyor belt, said infeed roller and said conveyor belt being positioned relative to one another such that GOM being conveyed on said conveyor belt is gripped between said belt and said infeed roller for feeding to said first cutting zone, said cutting mill being rotatably mounted on an axis spaced from and between the axes of rotation of said infeed roller and the conveyor roller at said one end of said conveyor belt.

16. Apparatus according to claim 15, wherein said infeed roller is mounted for relative movement away from said conveyor belt to accommodate variations in the bulk of GOM passing therebetween.

17. Apparatus according to claim 7, said blades rotating past and in close proximity to an anvil in each of said first and second cutting zones to facilitate cutting the GOM and particles respectively.

18. Apparatus according to claim 17, wherein each of said anvils is mounted for relative movement away from said blades to accommodate variations in the bulk of the GOM or particles passing therebetween.

* * * * *